US009341375B2

(12) United States Patent
Kim et al.

(10) Patent No.: US 9,341,375 B2
(45) Date of Patent: May 17, 2016

(54) SYSTEM FOR DAMPING OSCILLATIONS IN A TURBINE COMBUSTOR

(75) Inventors: Kwanwoo Kim, Mason, OH (US);
Venkateswarlu Narra, Simpsonville, SC (US); Praveen Kumar Babulal Jain, Abu Dhabi (AE); Sven Georg Bethke, Greenville, SC (US)

(73) Assignee: General Electric Company, Schenectady, NY (US)

( * ) Notice: Subject to any disclaimer, the term of this patent is extended or adjusted under 35 U.S.C. 154(b) by 791 days.

(21) Appl. No.: 13/189,085

(22) Filed: Jul. 22, 2011

(65) Prior Publication Data

US 2013/0019602 A1 Jan. 24, 2013

(51) Int. Cl.
*F23R 3/28* (2006.01)
*F23R 3/10* (2006.01)
*F23R 3/14* (2006.01)

(52) U.S. Cl.
CPC . *F23R 3/286* (2013.01); *F23R 3/10* (2013.01); *F23R 3/14* (2013.01); *F23R 2900/00014* (2013.01); *Y02T 50/675* (2013.01)

(58) Field of Classification Search
CPC .................. F23M 2900/00014; F23M 99/005; F05B 2260/96; F23R 3/002; F23R 3/10; F23R 3/14; F23R 3/286; F23R 2900/00014; Y02T 50/675; F23D 2210/00; F05D 2260/96; F05D 2260/961–2260/964; F05D 2270/14
USPC .......................................................... 60/725
See application file for complete search history.

(56) References Cited

U.S. PATENT DOCUMENTS

| 3,483,698 | A | * | 12/1969 | Ford .......................... F02K 9/56 60/725 |
|---|---|---|---|---|
| 5,096,010 | A | | 3/1992 | Ojala et al. |
| 5,349,141 | A | | 9/1994 | Horibe et al. |
| 5,373,695 | A | | 12/1994 | Aigner et al. |
| 5,431,018 | A | | 7/1995 | Keller |
| 5,644,918 | A | | 7/1997 | Gulati et al. |
| 5,771,851 | A | | 6/1998 | McLean |
| 5,894,823 | A | | 4/1999 | Lee |
| 6,351,947 | B1 | * | 3/2002 | Keller et al. ..................... 60/725 |
| 6,530,221 | B1 | | 3/2003 | Sattinger et al. |
| 6,758,304 | B1 | | 7/2004 | McLean |
| 6,820,431 | B2 | | 11/2004 | McManus et al. |
| 6,923,002 | B2 | | 8/2005 | Crawley et al. |

(Continued)

FOREIGN PATENT DOCUMENTS

| CN | 1705815 A | 12/2005 |
|---|---|---|
| CN | 1333161 C | 8/2007 |

(Continued)

OTHER PUBLICATIONS

U.S. Appl. No. 13/212,105, filed Aug. 17, 2011, Mohan Krishna Bobba.

(Continued)

*Primary Examiner* — William H Rodriguez
*Assistant Examiner* — Jared W Pike
(74) *Attorney, Agent, or Firm* — Fletcher Yoder, P.C.

(57) ABSTRACT

Certain embodiments include a resonator for the head end of a turbine combustor. The resonator is partially defined by first and second plates disposed about a fuel nozzle in the head end of the turbine combustor. The resonator is further configured to receive an air flow which extends through the resonator and into the fuel nozzle.

18 Claims, 5 Drawing Sheets

(56) References Cited

U.S. PATENT DOCUMENTS

| | | |
|---|---|---|
| 6,938,601 B2 | 9/2005 | Fukumoto |
| 6,981,358 B2 * | 1/2006 | Bellucci et al. .............. 60/39.17 |
| 7,080,514 B2 * | 7/2006 | Bland et al. ..................... 60/725 |
| 7,089,741 B2 * | 8/2006 | Ikeda et al. ..................... 60/725 |
| 7,117,974 B2 | 10/2006 | Moenssen et al. |
| 7,461,719 B2 | 12/2008 | Tobik et al. |
| 7,464,552 B2 | 12/2008 | Sattinger |
| 7,549,506 B2 | 6/2009 | Sattinger |
| 7,661,267 B2 | 2/2010 | Pollarolo |
| 7,788,926 B2 | 9/2010 | Johnson et al. |
| 2002/0000343 A1 | 1/2002 | Paschereit et al. |
| 2006/0059913 A1 | 3/2006 | Bethke et al. |
| 2008/0041058 A1 | 2/2008 | Johnson et al. |
| 2008/0173271 A1 | 7/2008 | Prior et al. |
| 2008/0245337 A1 | 10/2008 | Bandaru et al. |
| 2010/0011769 A1 | 1/2010 | Gambacorta et al. |
| 2011/0179795 A1 | 7/2011 | Johnson et al. |

FOREIGN PATENT DOCUMENTS

| | | |
|---|---|---|
| DE | 4414232 | 10/1995 |
| DE | 10004991 | 8/2001 |
| EP | 0974788 | 1/2000 |
| EP | 1085201 | 3/2001 |
| EP | 1557609 | 7/2005 |
| EP | 1669670 A1 | 6/2006 |
| EP | 2664852 A2 | 11/2013 |
| JP | 8158964 A | 6/1996 |
| JP | 9126074 A | 5/1997 |

OTHER PUBLICATIONS

U.S. Appl. No. 12/960,422, filed Dec. 3, 2010, Swanand Vijay Sardeshmukh.

European Search Report and Opinion issued in connection with corresponding EP Application No. 12177069.7 on Apr. 14, 2015.

Translation of CN Office Action issued on Mar. 31, 2015 in connection with corresponding CN Application No. 201210254600.1.

* cited by examiner

SYSTEM FOR DAMPING OSCILLATIONS IN A TURBINE COMBUSTOR

BACKGROUND OF THE INVENTION

The subject matter disclosed herein relates to turbine combustors, and, more particularly, to a system for damping oscillations in a turbine combustor.

A gas turbine engine combusts a fuel-air mixture in a combustor, and then drives one or more turbines with the resulting hot combustion gases. The turbine combustor may use dry low NOx (DLN) combustion. In DLN combustion, fuel and air are pre-mixed prior to ignition, which lowers emissions. However, the lean pre-mixed combustion process is susceptible to flow disturbances and acoustic pressure waves. For example, acoustic pressure waves may travel through a hot section of the turbine combustor formed by a liner and a transition piece, a cold section of the turbine combustor upstream from the liner, and a plenum upstream from fuel nozzles in the turbine combustor. Flow disturbances and acoustic pressure waves could result in self-sustained pressure oscillations at various frequencies. These pressure oscillations may be referred to as combustion dynamics. Combustion dynamics can cause structural vibrations, wearing, and other performance degradations. Unfortunately, DLN combustors have certain design features, which can complicate the mitigation of these pressure oscillations.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine combustor having a first fuel nozzle, a resonator configured to damp oscillations, and a first air path extending through the resonator into the first fuel nozzle.

In a second embodiment, a system includes a turbine combustor having a combustion chamber, a head end chamber, a divider plate disposed between the combustion chamber and the head end chamber, a first fuel nozzle disposed in the head end chamber, and a resonator disposed in the head end chamber. The resonator includes a resonator chamber disposed between first and second plates around the first fuel nozzle, and the resonator chamber is disposed at an offset distance from the divider plate.

In a third embodiment, a system includes a turbine combustor having a head end chamber and a combustion chamber separated from one another by a divider plate and a resonator disposed in the head end chamber, where the resonator comprises a resonator chamber disposed between first and second plates, and the resonator chamber is disposed at an offset distance from the divider plate. The turbine combustor also includes a first air path into the head end chamber and a second air path into the resonator, where the second air path extends through the resonator chamber and into the first path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward a tunable resonator for a head end of a turbine combustor. As mentioned above, gas turbine systems include turbine combustors which may use a DLN or other combustion process that is susceptible to flow disturbances and/or acoustic pressure waves. For example, the acoustic pressure waves may travel through a hot section formed by a liner and transition piece of the turbine combustor, a cold section upstream of the liner, and a plenum upstream of fuel nozzles in a head end of the turbine combustor. The combustion dynamics of the turbine combustor can result in self-sustained pressure oscillations that may cause structural vibrations, wearing, mechanical fatigue, thermal fatigue, and other performance degradations in the turbine combustor. A tunable resonator, according to the disclosed embodiments, is provided to damp combustion dynamics in the turbine combustor, and may be integrated with various head end components (e.g., fuel nozzles, air passages, and DLN specific designs). The resonator includes an enclosed volume that, when properly adjusted, can reduce or mitigate the transmission of acoustic pressure waves generated by the combustion process. Specifically, the resonator operates to attenuate and absorb the pressure waves produced by the turbine combustor. Moreover, the acoustic pressure waves produced by the combustion process can occur at a variety of frequencies. The volume enclosed by the disclosed tunable resonator may be varied to adjust its effective frequency range, thereby enabling the resonator to attenuate and absorb acoustic pressure waves produced by the turbine combustor at a variety of frequencies.

Certain embodiments of the resonator may be designed for a head end of a turbine combustor, and may include a volume defined by a front plate and a back plate in the head end. The front and back plates each have a plurality of holes to pass an air flow. Specifically, the air flow may be a cooling air flow that passes through the front plate, the enclosed volume, and the back plate, to enter a head end chamber of the turbine combustor. The cooling air flow is then mixed with fuel supplied by fuel nozzles in the head end for combustion in the turbine combustor. Additionally, as mentioned above, the combustion process within the turbine combustor produces acoustic pressure waves that may interfere with the operation of the turbine combustor. In certain embodiments, the acoustic pressure waves in the head end chamber of the turbine combustor flow into the volume defined by the front and back plates. The front and back plates are separated by a variable offset distance, such that the enclosed volume may be tuned to absorb a desired range of acoustic pressure wave frequencies. By absorbing acoustic pressure waves, the volume defined by the front and back plates can suppress pressure fluctuations in the head end of the turbine combustor. Furthermore, the suppression of pressure fluctuations in the head end may help reduce pressure fluctuations in the combustion chamber of the turbine combustor, downstream of the combustion chamber, and also further upstream of the head end.

Figure 1:
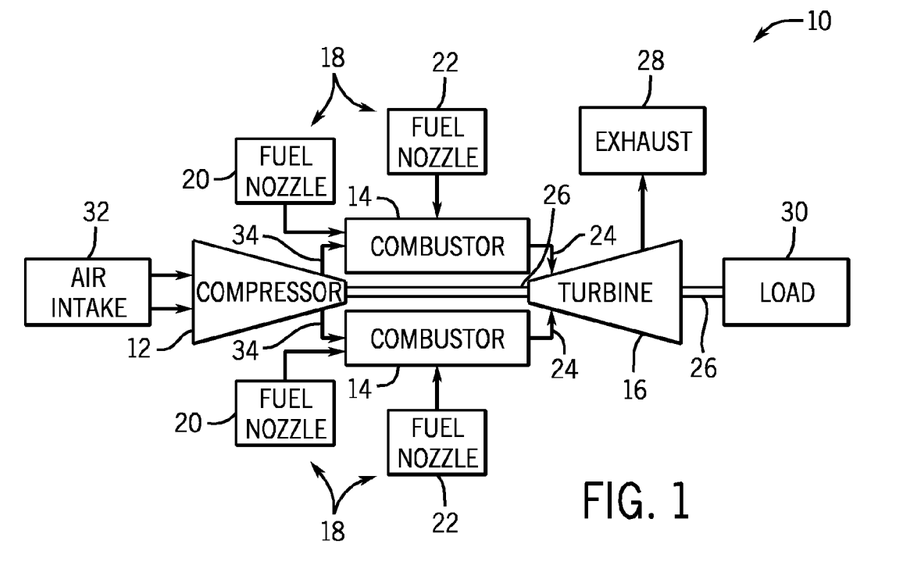
FIG. 1 is a schematic of an embodiment of a gas turbine system with a plurality of turbine combustors, each having a head end resonator configured to damp oscillations associated with combustion dynamics.

Turning now to the drawings, FIG. 1 illustrates a block diagram of an embodiment of a gas turbine system 10. The system 10 includes a compressor 12, turbine combustors 14, and a turbine 16. The turbine combustors 14 include fuel nozzles 18 which route a liquid fuel and/or gas fuel, such as natural gas or syngas, into the turbine combustors 14. As shown, each turbine combustor 14 may have multiple fuel nozzles 18. More specifically, the turbine combustors 14 may each include a primary fuel injection system having primary fuel nozzles 20 and a secondary fuel injection system having secondary fuel nozzles 22. As described in detail below, each turbine combustor 14 may also include a head end resonator configured to receive an air flow and direct the flow into a head end chamber of the turbine combustor 14. Furthermore, the head end resonator of each turbine combustor 14 is configured to mitigate acoustic waves and suppress pressure fluctuations in the turbine combustor 14.

The turbine combustors 14 ignite and combust an air-fuel mixture, and then pass hot pressurized combustion gasses 24 (e.g., exhaust) into the turbine 16. Turbine blades are coupled to a shaft 26, which is also coupled to several other components throughout the turbine system 10. As the combustion gases 24 pass through the turbine blades in the turbine 16, the turbine 16 is driven into rotation, which causes the shaft 26 to rotate. Eventually, the combustion gases 24 exit the turbine system 10 via an exhaust outlet 28. Further, the shaft 26 may be coupled to a load 30, which is powered via rotation of the shaft 26. For example, the load 30 may be any suitable device that may generate power via the rotational output of the turbine system 10, such as an electrical generator, a propeller of an airplane, and so forth.

Compressor blades are included as components of the compressor 12. The blades within the compressor 12 are coupled to the shaft 26, and will rotate as the shaft 26 is driven to rotate by the turbine 16, as described above. The rotation of the blades within the compressor 12 compress air from an air intake 32 into pressurized air 34. The pressurized air 34 is then fed into the fuel nozzles 18 of the turbine combustors 14. The fuel nozzles 18 mix the pressurized air 34 and fuel to produce a suitable mixture ratio for combustion (e.g., a combustion that causes the fuel to more completely burn) so as not to waste fuel or cause excess emissions. As discussed below, the compressed air may pass through and/or around the head end resonator in each combustor 14 upstream from fuel injection, while acoustic pressure waves are able to enter and become damped in the resonator.

Figure 2:
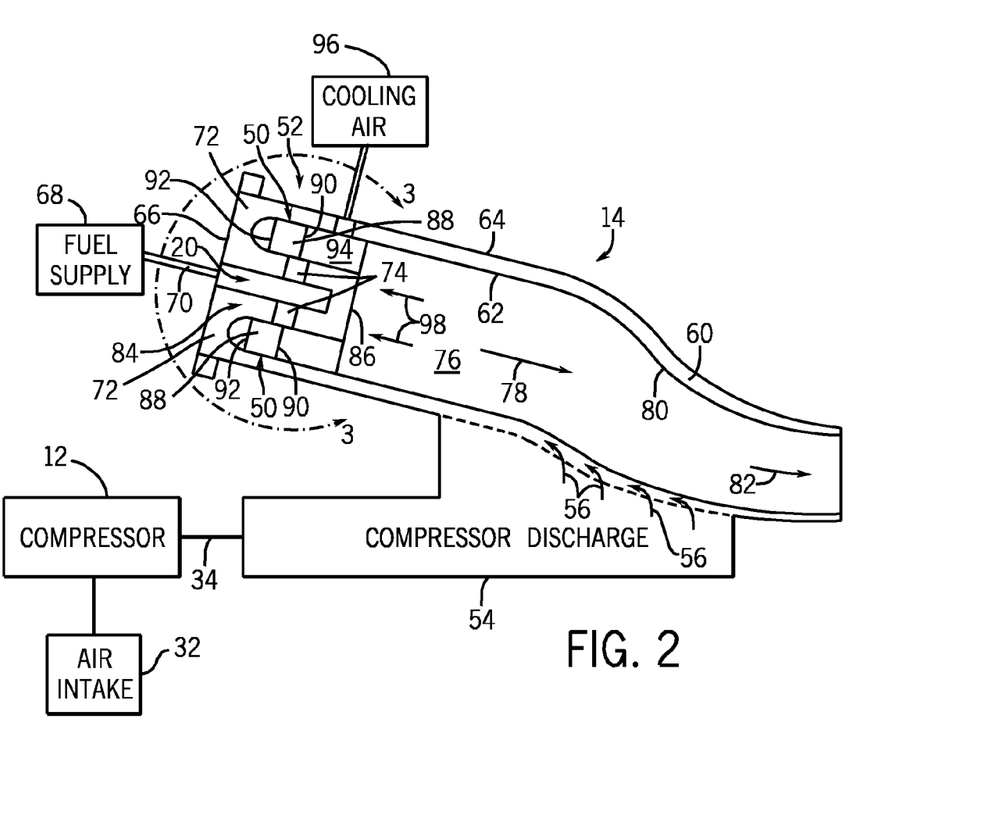
FIG. 2 is a cross-sectional side view schematic of an embodiment of one of the turbine combustors of FIG. 1, illustrating an embodiment of the head end resonator.

FIG. 2 is a schematic of an embodiment of one of the turbine combustors 14 of FIG. 1, illustrating a head end resonator 50 disposed within a head end 52 of the turbine combustor 14. As described above, the compressor 12 receives air from an air intake 32, compresses the air, and produces a flow of pressurized air 34 for use in the combustion process within the turbine combustor 14. As shown in the illustrated embodiment, the pressurized air 34 is received by a compressor discharge 54 that is operatively coupled to the turbine combustor 14. As indicated by arrows 56, the pressurized air 34 flows from the compressor discharge 54 towards the head end 52 of the turbine combustor 14. More specifically, the pressurized air 34 flows through an annulus 60 between a liner 62 and a flow sleeve 64 of the turbine combustor 14 to reach the head end 52.

In certain embodiments, the head end 52 includes an end plate 66 that may support the primary fuel nozzles 20 depicted in FIG. 1. In the illustrated embodiment, the head end 52 has a single primary fuel nozzle 20 and associated resonator 50. However, as discussed below, the head end 52 may include a plurality of fuel nozzles 20 and associated resonators 50. A primary fuel supply 68 provides fuel 70 to the primary fuel nozzle 20. Additionally, an air flow path 72 delivers the pressurized air 34 from the annulus 60 of the turbine combustor 14 through the primary fuel nozzle 20. The primary fuel nozzle 20 combines the pressurized air 34 with the fuel 70 provided by the primary fuel supply 68 to form an air/fuel mixture. Specifically, the fuel 70 may be injected into the air flow path 72 by a plurality of swirl vanes 74. The air/fuel mixture flows from the air flow path 72 into a combustion chamber 76 where the air/fuel mixture is ignited and combusted to form combustion gases (e.g., exhaust). The combustion gases flow in a direction 78 toward a transition piece 80 of the turbine combustor 14. The combustion gases pass through the transition piece 80, as indicated by arrow 82, toward the turbine 16, where the combustion gases drive the rotation of the blades within the turbine 16.

The turbine combustor 14 also includes the head end resonator 50. As mentioned above, the combustion process produces a variety of pressure waves, acoustic waves, and other oscillations referred to as combustion dynamics. Combustion dynamics may cause performance degradation, structural stresses, and mechanical or thermal fatigue in the turbine combustor 14. Therefore, turbine combustors 14 may include one or more resonators 50 to help mitigate the effects of combustion dynamics in the turbine combustor 14. In the illustrated embodiment, the head end resonator 50 is disposed within a head end chamber 84 of the turbine combustor 14. As shown, the head end chamber 84 is separated from the combustion chamber 76 by a cap, cover plate, or divider plate 86. The head end resonator 50 includes a volume 88 partially defined by a front plate 90 and a back plate 92. As shown, the front plate 90 and the back plate 92 are both offset from the divider plate 86 in an upstream direction. Furthermore, an air flow path 94 passes through the volume 88 of the head end resonator 50. As discussed in detail below, cooling air 96 flows through the air flow path 94, through the volume 88 of the head end resonator 50, and into the air flow path 72, where the cooling air 96 is mixed with the fuel 70 and the pressurized air 34. In certain embodiments, the cooling air 96 may be the pressurized air 34 from the compressor 12 or another source. Additionally, the volume 88 of the head end resonator 50 is configured to absorb acoustic pressure waves generated by the combustion process in the turbine combustor 14. As discussed below, acoustic pressure waves from the combustion chamber 76 may travel toward the head end 52 of the turbine combustor 14, as indicated by arrows 98. In particular, the acoustic pressure waves travel through the air flow path 72 and into the volume 88 of the head end resonator 50 where the acoustic pressure waves are suppressed. Additionally, the front plate 90 and/or the back plate 92 may be adjusted and positioned such that the size of the volume 88 is tuned to absorb a desired range of acoustic pressure wave frequencies.

Figure 3:
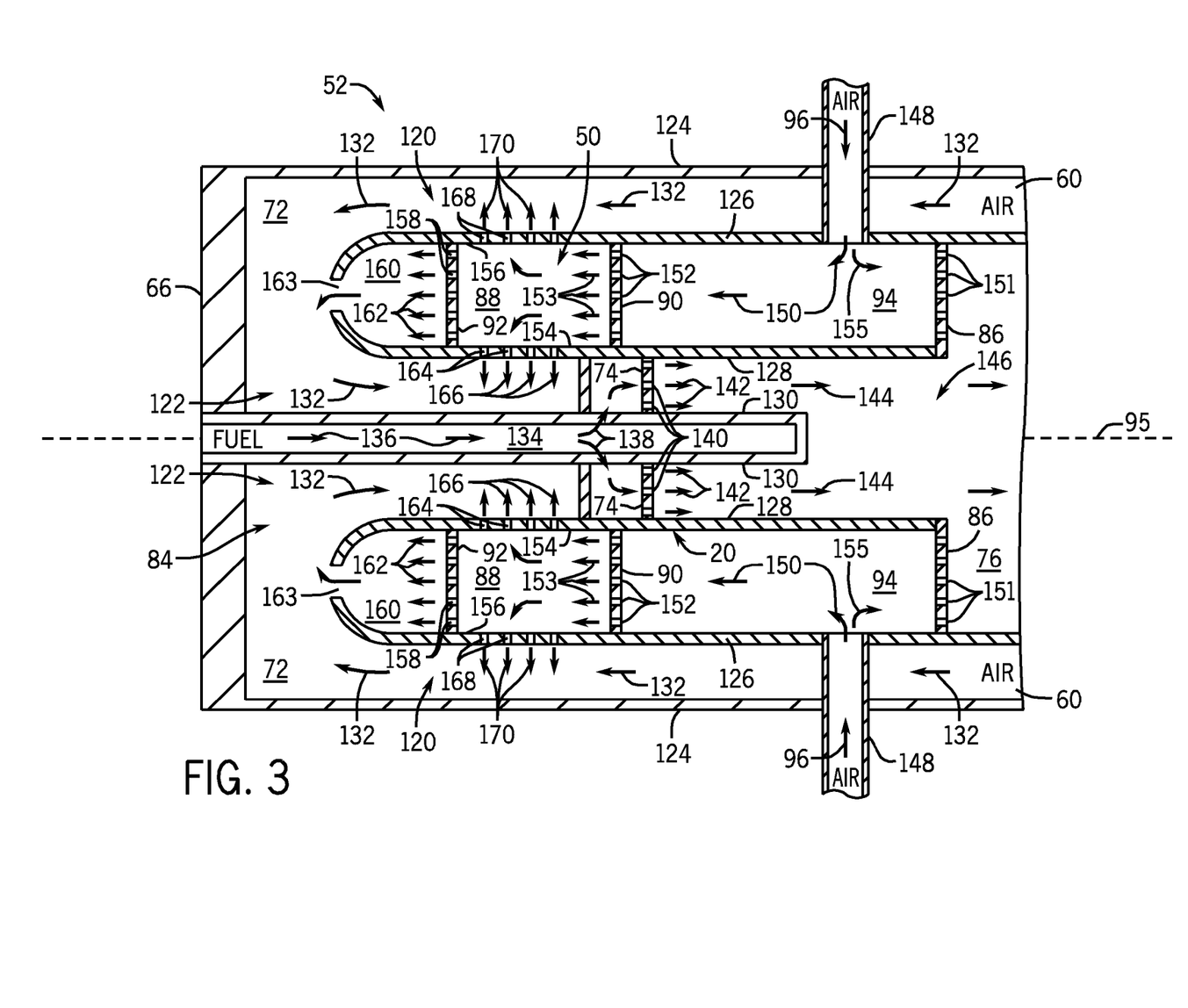
FIG. 3 is a cross-sectional side view schematic of an embodiment of a head end of the turbine combustor of FIG. 2, taken along line 3-3, further illustrating air flow paths around and through the head end resonator.

FIG. 3 is a schematic of an embodiment of the head end 52 of the turbine combustor 14, taken along line 3-3 of FIG. 2, illustrating the head end resonator 50 and the primary fuel nozzle 20 disposed within the head end chamber 84. In the illustrated embodiment, the head end resonator 50 includes the front plate 90 and the back plate 92 (disposed cross-wise to a central axis 95 of the turbine combustor 14), which partially define the volume 88 of the head end resonator 50.

As mentioned above, the air flow path 72 receives the pressurized air 34 from the annulus 60 of the turbine combustor 14. As shown, the air flow path 72 contains a first portion 120 and a second portion 122, and the first portion 120 and the second portion 122 are operatively coupled. The first portion 120 of the air flow path 72 is defined by an outer wall 124 (e.g, a head end casing) and an inner wall 126 (e.g., a head end sleeve) of the turbine combustor 14. The second portion 122 of the air flow path 72 is defined by an outer shell 128 and an inner shell 130 of the fuel nozzle 20. As indicated by arrows 132, the pressurized air 34 flows from the annulus 60, first through the first portion 120 of the air flow path 72 in an upstream direction, and then through the second portion 122 of the air flow path 72 in a downstream direction. Subsequently, the pressurized air 34 flows around the swirl vanes 74. As discussed above, the fuel 70 is released into the pressurized air 34 through the swirl vanes 74. Specifically, the fuel 70 flows down a fuel path 134 within the inner shell 130 of the fuel nozzle 20, as represented by arrows 136. The fuel 70 passes into the swirl vanes 74 from the fuel path 134, as represented by arrows 138, and exits the swirl vanes 74 through fuel ports 140 in the swirl vanes 74, as represented by arrows 142. The fuel 70 mixes with the pressurized air 34 to create an air/fuel mixture. The air/fuel mixture flows downstream, as indicated by arrows 144, toward the combustion chamber 76. In the illustrated embodiment, the divider plate 86 includes an opening 146 that operatively joins the head end chamber 84 and the combustion chamber 76.

As mentioned above, the head end 52 of the turbine combustor 14 includes the head end resonator 50 which receives cooling air 96 from the air flow path 94. Specifically, the cooling air 96 enters the head end chamber 84 of the turbine combustor 14 through a cooling air inlet 148. For example, the cooling air 96 may be supplied by the compressor discharge 54. While the illustrated embodiment shows two cooling air inlets 148, other embodiments may include fewer or more cooling air inlets 148. For example, the turbine combustor 14 may have 1, 3, 4, 5, 6, 7, 8, or more cooling air inlets 148. The air flow path 94 receives the cooling air 96 from the cooling air inlet 148 and directs the cooling air 96 in an upstream direction towards the head end resonator 50, as indicated by arrows 150. Additionally, the cooling air 96 may be directed toward apertures 151 in the divider plate 86, as indicated by arrows 155. In certain embodiments, the apertures 151 may be straight or angled holes. The cooling air 96 may pass through the apertures 151, thereby cooling the divider plate 86 and entering the combustion chamber 76.

In the illustrated embodiment, the air flow path 94 is defined by the inner wall 126 of the turbine combustor 14 and the outer shell 128 of the fuel nozzle 20. As will be appreciated, the air flow path 94 is an annular path that extends around the fuel nozzle 20. The cooling air 96 enters the volume 88 of the head end resonator 50 by passing through apertures 152 formed in the front plate 90 of the head end resonator 50, as represented by arrows 153. The apertures 152 may vary in shape, size, and number. For example, the apertures 152 may be circles, ovals, triangles, squares, or other polygonal shapes. Additionally, there may be any number of apertures 152. For example, there may be approximately 1 to 1000, 1 to 500, 1 to 250, 1 to 100, 1 to 50, 1 to 25, or 5 to 10 apertures 152 formed in the front plate 90. In certain embodiments, the apertures 152 in the front plate 90 may be the same size, and, in other embodiments, the apertures 152 may be different sizes.

Once the cooling air 96 enters the volume 88 of the head end resonator 50 through the apertures 152 of the front plate 90, the cooling air 96 passes through the volume 88 and exits the head end resonator 50 into the air flow 72. As shown, the volume 88 of the head end resonator 50 is defined by the front plate 90, the back plate 92, a portion 154 of the outer shell 128 of the fuel nozzle 20, and a portion 156 of the inner wall 126 of the turbine combustor 14. As shown, the back plate 92 includes apertures 158 which operatively join the volume 88 and a cavity 160 between the outer shell 128 of the fuel nozzle 20 and the inner wall 126 of the turbine combustor 14. Cooling air 96 within the volume 88 passes through the apertures 158 formed in the back plate 92 and enters the cavity 160, as represented by arrow 162. The cooling air 96 then exits the cavity 160 through an opening 163, which may be any size or shape, and flows into the air flow path 72 where the cooling air 96 combines with the pressurized air 34 and with fuel 70 deposited into the air flow path 72 by the swirl vanes 74, as described above. Additionally, the portion 154 of the outer shell 128 of the fuel nozzle 20 that partially defines the volume 88 similarly includes apertures 164, which operatively join the air flow path 72 and the volume 88. The cooling air 96 within the volume 88 of the head end resonator 50 passes through the apertures 164 and flows into the air flow path 72, as represented by arrows 166, where the cooling air 96 mixes with pressurized air 34 and fuel 70. Furthermore, the portion 156 of the inner wall 126 of the turbine combustor 14 includes apertures 168, which operatively join the air flow path 72 and the volume 88. The cooling air 96 may also pass through the apertures 168 and flow into the air flow path 72, as represented by arrows 170, where the cooling air 96 mixes with pressurized air 34 and fuel 70. As with the apertures 152 of the front plate 90, the apertures 158, 164, and 168 may vary in shape, size, and number. As mentioned above, the flow of cooling air 96 into the air flow path 72 from the air flow path 94 helps achieve an improved air/fuel mixture in the head end chamber 84 of the turbine combustor 14, thereby improving the performance and efficiency of the combustion process. For example, the flow of the cooling air 96 in addition to the flow of the pressurized air 34 to create the air/fuel mixture may be useful in turbine combustors 14 using a DLN combustion process.

Furthermore, the cooling air 96 may also cool the divider plate 86. As will be appreciated, the divider plate 86 abuts the hot combustion zone 76 where the combustion process occurs. As a result, the cooling air 96 passing through the air flow path 94 and adjacent to the divider plate 86 may cool the divider plate 86 before flowing to the head end resonator 50. As will be appreciated, the cooling air 96 flowing from the cooling air inlet 148 may be cooler than other air (e.g., the compressed air 34), thereby providing additional cooling for the divider plate 86.

As described above, the head end resonator 50 is integrated with the head end 52 and the fuel nozzle 20 of the turbine combustor 14. That is, the structure of the head end resonator 50 is partially defined by portions of both the head end 52 and the fuel nozzle 20. Similarly, the head end resonator 50 is integrated with the first and second portions 120 and 122 of the air flow path 72 in the head end 52. As a result, the head end resonator 50 may be implemented in certain existing designs of the turbine combustor 14. Furthermore, other embodiments of the head end resonator 50 may be integrated with other air flow paths within the head end 52 of the turbine combustor 14. Additionally, while the illustrated embodiment shows the head end resonator 50 upstream of fuel injection (i.e., upstream from the swirl vanes 74), other embodiments may include one or more head end resonators 50 downstream of fuel injection. Similarly, the apertures 158, 164, and 168 are upstream from fuel injection within the head end 52. However, in other embodiments, some or all of the apertures 158, 164, and 168 may be downstream from fuel injection within the head end 52 (i.e., downstream from the swirl vanes 74). Consequently, all or part of the cooling air flow 96 may flow from the head end resonator 50 into the air flow 72 downstream of the fuel injection in the head end 52.

Figure 4:
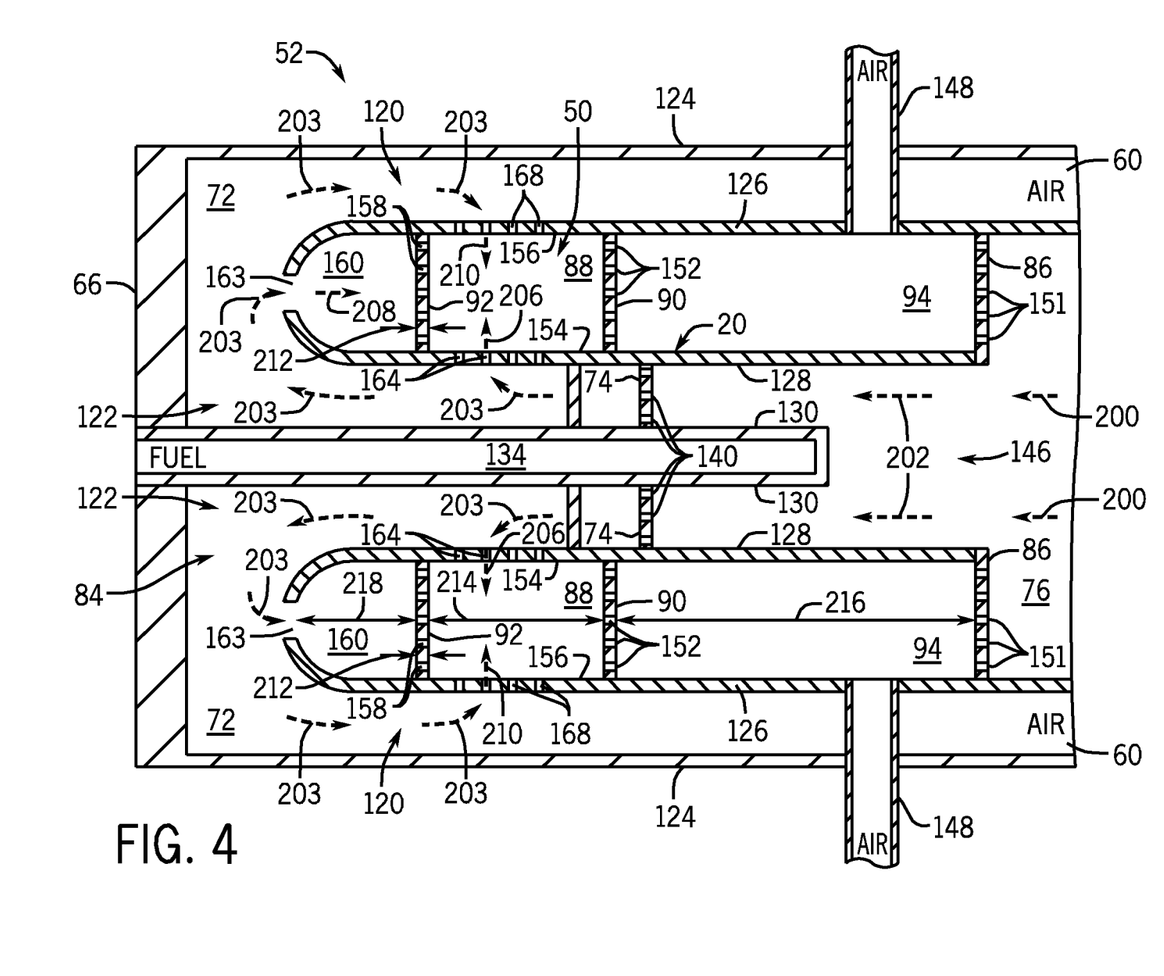
FIG. 4 is a cross-sectional side view schematic of the turbine combustor of FIG. 2, taken along line 3-3, further illustrating pressure oscillations being damped by the head end resonator.

FIG. 4 is a schematic of an embodiment of the head end 52 of the turbine combustor 14, taken along line 3-3 of FIG. 2, illustrating the head end resonator 50 and primary fuel nozzle 20 disposed within the head end chamber 84. The illustrated embodiment shows the flow of acoustic pressure waves and oscillations within the head end chamber 84 of the turbine combustor 14. Specifically, the acoustic pressure waves and oscillations are attenuated and damped by the head end resonator 50.

As mentioned above, the combustion process within the turbine combustor 14 produces acoustic pressure waves and oscillations that can reduce performance of the turbine combustor 14. Specifically, flow disturbances and acoustic pressure waves could result in self-sustained pressure oscillations at various frequencies, which can cause structural vibrations, wearing, and other performance degradations in the turbine combustor 14. In the illustrated embodiment, acoustic pressure waves flow in an upstream direction toward the head end 52 of the turbine combustor 14 from the combustion chamber 76, as represented by arrows 200. Upon reaching the divider plate 86, the acoustic pressure waves continue to travel upstream in the air flow path 72 inside the fuel nozzle 20, as represented by arrows 202. However, the acoustic pressure waves do not pass through the divider plate 86 directly into the air flow path 94 or the volume 88 of the resonator 50. Again, the air flow path 94 provides a cooling air flow 96 along the divider plate 86 to cool the plate 86 adjacent the combustion chamber 76. Inside the fuel nozzle 20, the acoustic pressure waves continue through the air flow path 72 upstream of the swirl vanes 74, as indicated by arrows 203. As the acoustic pressure waves continue to propagate upstream through the air flow path 72, the acoustic pressure waves are absorbed by the head end resonator 50. More specifically, the acoustic pressure waves pass through the apertures 158, 164, and/or 168 of the head end resonator 50 and enter the volume 88 of the head end resonator 50. As discussed above, a resonator may include an enclosed volume and one or more necks configured to absorb acoustic waves and oscillations. In the illustrated embodiment, the apertures 158, 164, and 168 serve as the "necks" of the head end resonator 50. For example, acoustic pressure waves enter the volume 88 through the apertures 164 formed in the portion 154 of the outer shell 128 of the fuel nozzle 20, as represented by arrow 206. Similarly, acoustic pressure waves enter the cavity 160 through the opening 163, as shown by arrow 208, and pass through the apertures 158 formed in the back plate 92 of the head end resonator 50. The acoustic pressure waves further flow through the air flow path 72 and enter the volume 88 of the head end resonator 50 through the apertures 168 formed in the portion 156 of the inner wall 126 of the turbine combustor 14, as represented by arrows 210.

The size, shape, and length of the apertures 158, 164, and 168 (i.e., the "necks" of the head end resonator 50) may be selected to absorb a desired range of frequencies of acoustic pressure waves. For example, a thickness 212 of the back plate 92 (i.e., the "length" of the apertures 158) may be selected based on the range of frequencies of acoustic pressure waves to be absorbed by the apertures 158. Thicknesses of the outer shell 128 of the fuel nozzle 20 and the inner wall 126 of the turbine combustor 14 may be similarly selected to determine the length of the apertures 164 and 168, respectively. Furthermore, each set of the apertures 158, 164, and 168 may be tuned to absorb the same range of frequencies or different ranges of frequencies. For example, the apertures 158 may have certain diameters, lengths, numbers, and so forth, for absorbing a first range of frequencies, and the apertures 164 and 168 may have different diameters, lengths, numbers, and so forth, for absorbing a second and third range of frequencies, respectively.

Furthermore, as mentioned above, the size of the volume 88 of the head end resonator 50 may be varied and tuned for the absorption of a desired range of acoustic pressure wave frequencies. Specifically, the size of the volume 88 may be adjusted by increasing or decreasing a distance 214 between the front plate 90 and the back plate 92 of the head end resonator 50. For example, the size of the volume 88 is increased by shifting the plate 90 towards the divider plate 86, thereby decreasing an offset distance 216 between the divider plate 86 and the front plate 90. For example, the ratio of the distance 214 to the distance 216 may be approximately 1/1 to 1/500, 1/1 to 1/250, 1/1 to 1/100, 1/1 to 1/80, 1/1 to 1/60, 1/1 to 1/40, 1/1 to 1/20, 1/1 to 1/10, 1/1 to 1/8, 1/1 to 1/6, 1/1 to 1/4, or 1/1 to 1/2. Similarly, the size of the volume 88 may be increased by shifting the back plate 92 towards the end plate 66 of the turbine combustor 14, thereby decreasing an offset distance 218 between the back plate 92 and the opening 163 of the cavity 160. For example, the ratio of the distance 214 to the distance 218 may be approximately 1/1 to 1/500, 1/1 to 1/250, 1/1 to 1/100, 1/1 to 1/80, 1/1 to 1/60, 1/1 to 1/40, 1/1 to 1/20, 1/1 to 1/10, 1/1 to 1/8, 1/1 to 1/6, 1/1 to 1/4, or 1/1 to 1/2. By increasing or decreasing the size of the volume 88, the head end resonator 50 may be tuned to absorb a desired range of frequencies of the acoustic pressure waves produced by the combustion process.

Furthermore, certain embodiments of the turbine combustor 14 may include more than one head end resonator 52 (i.e., more than one volume 88). Specifically, the head end 52 of the turbine combustor 14 may include additional front plates 90 or back plates 92, thereby defining more than one volume 88. For example, the head end resonator 50 may include approximately 1 to 100, 2 to 50, 3 to 40, 4 to 30, 5 to 20, or 6 to 10 volumes 88. In certain embodiments, the multiple volumes 88 may be tuned to absorb the same range of acoustic pressure wave frequencies, while other embodiments may have multiple volumes 88 tuned to absorb different ranges of acoustic pressure wave frequencies.

Figure 5:
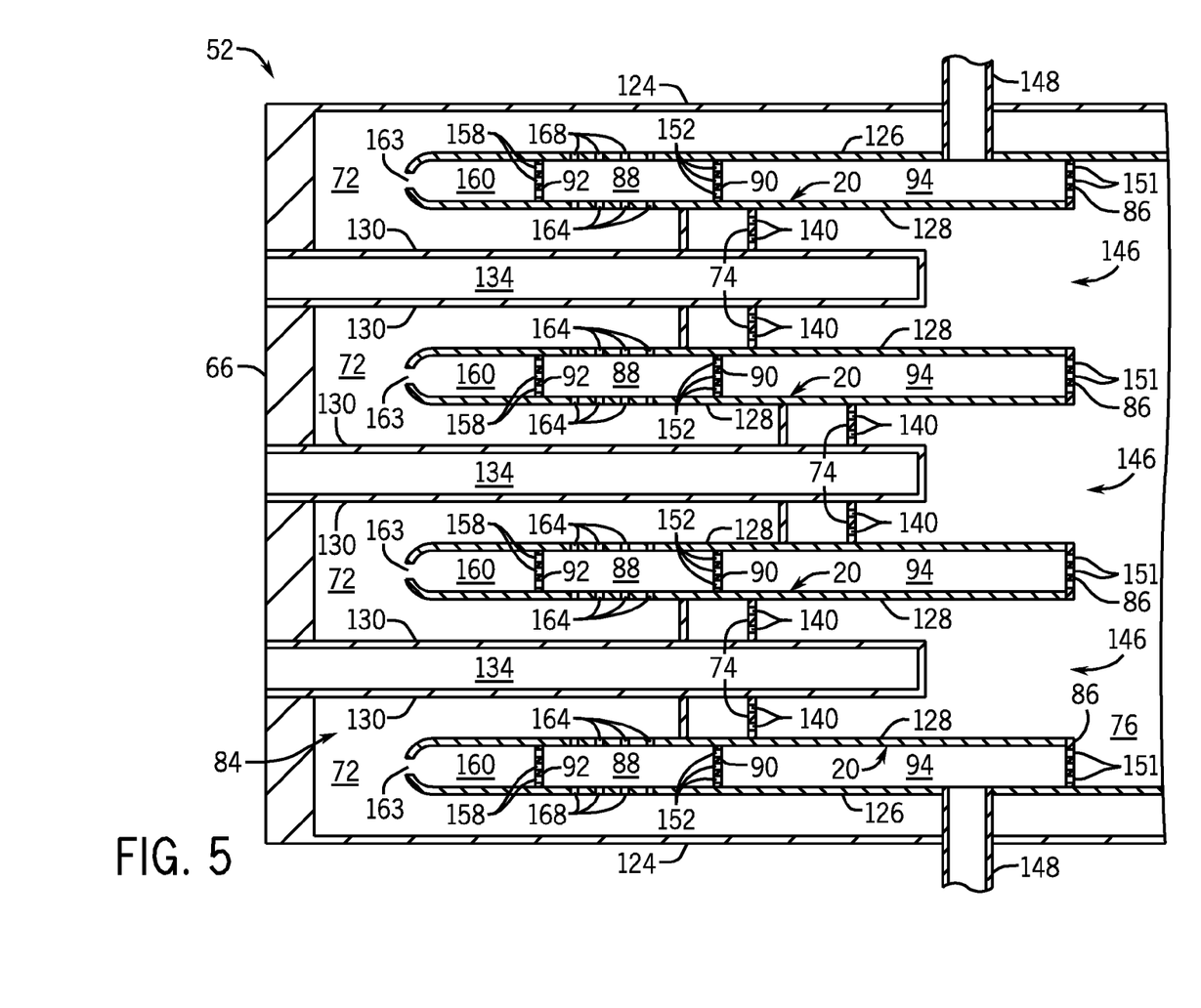
FIG. 5 is a cross-sectional side view schematic of the turbine combustor of FIG. 2, taken along line 3-3, illustrating a plurality of head end resonators.

FIG. 5 is a schematic of an embodiment of the head end 52 of the turbine combustor 14, taken along line 3-3 of FIG. 2, illustrating the head end resonator 50 and a plurality of fuel nozzles 20 disposed within the head end chamber 84. For example, the fuel nozzles 20 may include a central fuel nozzle and a plurality of surrounding fuel nozzles (e.g., 2 to 10). In the illustrated embodiment, the head end resonator 50 includes the front plate 90 and the back plate 92, which partially define the volume 88 of the head end resonator 50. As discussed above, the front and back plates 90 and 92 are disposed about the fuel nozzles 20. Consequently, the volume 88 is a continuous volume that partially surrounds the fuel nozzles 20. Similarly, the air flow path 94 formed between the fuel nozzles 20 is a continuous path that receives the cooling air 96 from the cooling air inlet 148 and directs the cooling air 96 to the volume 88 of the head end resonator 50. As mentioned above, at least a portion of the cooling air 96 in the volume 88 may exit the head end resonator 50 through the apertures 158 in the back plate 92. Similarly, the apertures 158 in the back plate 92 are configured to absorb acoustic pressure waves produced by the combustion process. In the illustrated embodiment, each fuel nozzle 20 includes the apertures 164 to pass the cooling air 96 from the volume 88 of the head end resonator 50 and into the air flow path 72. Additionally, the apertures 164 and the volume 88 absorb acoustic pressure waves produced by the combustion process that flow within the head end chamber 84. Furthermore, the inner wall 126 of the turbine combustor 14 surrounding the fuel nozzles 20 includes the apertures 168. As discussed above, the apertures 168 flow the cooling air 96 from the volume 88 and absorb acoustic pressure waves produced by the combustion process.

Figure 6:
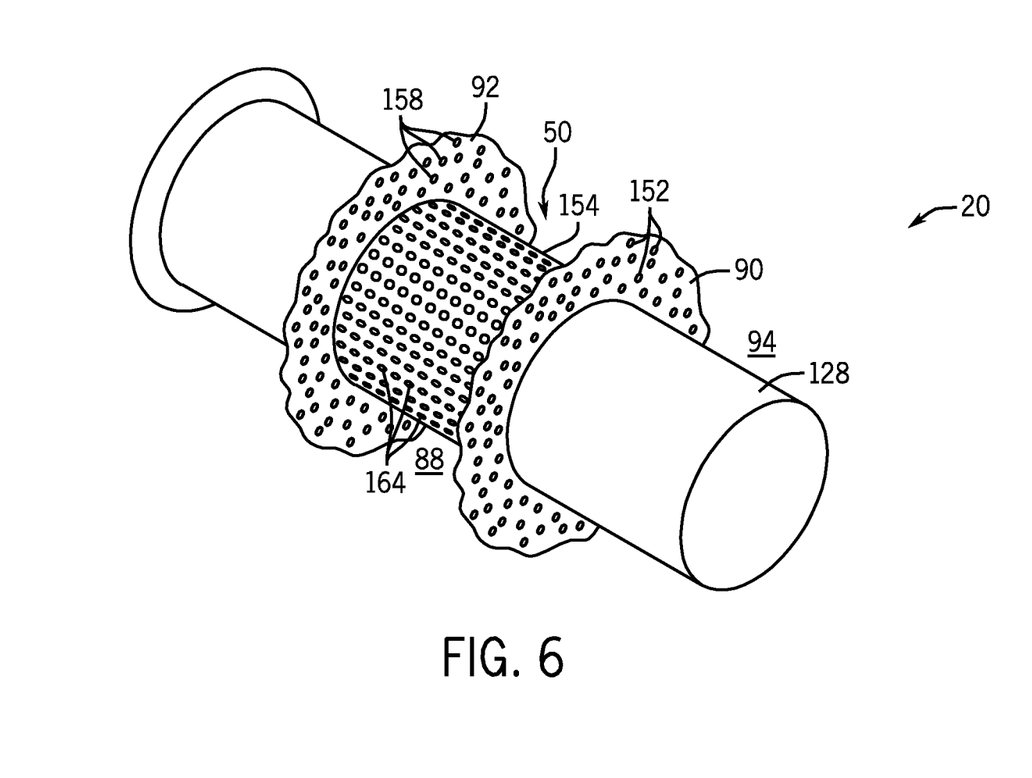
FIG. 6 is a partial perspective view of an embodiment of a fuel nozzle surrounded by a resonator.

FIG. 6 is a partial perspective view of an embodiment of a fuel nozzle 20 having the head end resonator 50 with the volume 88 partially formed by the front and back plates 90 and 92. As discussed above, the front and back plates 90 and 92 are disposed about the outer shell 128 of the fuel nozzle 20, and the volume 88 of the head end resonator 50 is formed in between the front and back plates 90 and 92. Furthermore, the front plate 90 includes the apertures 152 which receive the cooling air 96 from the air flow path 94. Similarly, the back plate 92 has the apertures 158, and the portion 154 of the outer shell 128 of the fuel nozzle 20 has the apertures 164 to pass the cooling air 96 out of the volume 88 and into the air flow path 72. The apertures 158 and 164 also receive and absorb acoustic pressure waves traveling within the head end chamber 84 of the turbine combustor 14. Specifically, the acoustic pressure waves flow through the apertures 158 and 164 into the volume 88 of the head end resonator 50, where the acoustic pressure waves are suppressed. As discussed above, the apertures 152, 158, and 164 may have varying shapes, sizes, numbers, and so forth, so that the head end resonator 50 is tuned to mitigate a desired range of acoustic pressure wave frequencies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine combustor, comprising:
a head end, comprising:
a first fuel nozzle comprising an outer body; and
an air flow chamber in fluid communication with cooling air introduced from a source outside of the head end via a cooling air inlet, the air flow chamber is defined by an inner wall of the turbine combustor and the outer body of the first fuel nozzle, the air flow chamber extends from a divider plate at its downstream end to an opening between respective axial ends of the inner wall of the turbine combustor and the outer body of the first fuel nozzle at its upstream end, and the air flow chamber comprises:
a resonator configured to damp oscillations, wherein the resonator comprises a plurality of radial openings disposed in the inner wall of the turbine combustor and the outer body of the first fuel nozzle, a plurality of axial openings disposed in a first resonator plate, a second resonator plate, and the divider plate, and a resonator chamber disposed between the first and second resonator plates, and the first and second resonator plates extend around the first fuel nozzle.

2. The system of claim 1, wherein the turbine combustor comprises a combustion chamber, wherein the divider plate is disposed between the combustion chamber and the head end.

3. The system of claim 2, wherein the resonator chamber is disposed at an offset distance from the divider plate.

4. The system of claim 1, comprising a second fuel nozzle, wherein the first and second resonator plates and the resonator chamber extend around the first and second fuel nozzles.

5. The system of claim 1, wherein a first air path extends through the cooling air inlet, through a first axial opening of the plurality of axial openings in the first resonator plate into the resonator chamber, through a second axial opening of the plurality of axial openings in the second resonator plate, through the opening between the respective axial ends of the inner wall of the turbine combustor and the outer body of the first fuel nozzle, and into the first fuel nozzle.

6. The system of claim 5, wherein the turbine combustor comprises a second air path extending into the first fuel nozzle, wherein the second air path extends through the cooling air inlet, through the first axial opening of the plurality of axial openings in the first resonator plate into the resonator chamber, and through a first radial opening of the plurality of radial openings into the first fuel nozzle.

7. The system of claim 6, wherein the first radial opening is disposed in the outer body of the first fuel nozzle.

8. The system of claim 1, wherein a distance between the first and second resonator plates is configured to tune the resonator chamber to a frequency of the oscillations.

9. The system of claim 1, comprising a gas turbine engine having the turbine combustor.

10. The system of claim 1, wherein the resonator chamber is upstream of fuel injection from the first fuel nozzle.

11. A system, comprising:
a turbine combustor, comprising:
a combustion chamber;
a head end chamber;
a divider plate disposed between the combustion chamber and the head end chamber;
a first fuel nozzle disposed in the head end chamber; and an air flow chamber disposed in the head end chamber, wherein the air flow chamber is in fluid communication with cooling air introduced from a source outside of the head end chamber via a cooling air inlet, the air flow chamber is defined by an inner wall of the turbine combustor and an outer body of the first fuel nozzle, the air flow chamber extends from the divider plate at its downstream end to an opening between respective axial ends of the inner wall of the turbine combustor and the outer body of the first fuel nozzle at its upstream end, and the air flow chamber comprises:
    a resonator disposed in the air flow chamber, wherein the resonator comprises a resonator chamber disposed around the first fuel nozzle and between first and second plates of the resonator, the first and second plates are coupled to the first fuel nozzle, the resonator chamber is disposed at an offset distance from the divider plate, the resonator comprises a plurality of radial openings disposed in the inner wall of the turbine combustor and the outer body of the first fuel nozzle, and the resonator comprises a plurality of axial openings disposed in the first and second plates and the divider plate.

12. The system of claim 11, wherein the first and second plates extend crosswise relative to a central axis of the turbine combustor.

13. The system of claim 12, comprising a second fuel nozzle disposed in the head end chamber, wherein the first and second plates are coupled to the second fuel nozzle, and the first and second plates and the resonator chamber extend around the first and second fuel nozzles.

14. The system of claim 12, wherein the inner wall of the turbine combustor is disposed inside a casing wall.

15. The system of claim 11, wherein the first fuel nozzle comprises an inner body having a fuel path, the outer body is disposed about the inner body to define an air path, and the first fuel nozzle comprises a plurality of fuel injection ports configured to inject fuel from the fuel path into the air path, wherein the resonator chamber is coupled to the air path upstream from the plurality of fuel injection ports.

16. A system, comprising:
a turbine combustor, comprising:
    a head end chamber and a combustion chamber separated from one another by a divider plate;
    a fuel nozzle disposed in the head end chamber; and
    an air flow chamber disposed in the head end chamber, wherein the air flow chamber is in fluid communication with cooling air introduced from a source outside of the head end chamber via a cooling air inlet, the air flow chamber is defined by an inner wall of the turbine combustor and an outer body of the fuel nozzle, the air flow chamber extends from the divider plate at its downstream end to an opening between respective axial ends of the inner wall of the turbine combustor and the outer body of the fuel nozzle at its upstream end, and the air flow chamber comprises:
        a resonator disposed in the air flow chamber, wherein the resonator comprises a resonator chamber disposed between first and second plates, the first and second plates are coupled to the outer body of the fuel nozzle and are oriented crosswise to a central axis of the turbine combustor, the resonator chamber is disposed at an offset distance from the divider plate, the resonator comprises a plurality of radial openings disposed in the inner wall of the turbine combustor and the outer body of the fuel nozzle, and the resonator comprises a plurality of axial openings disposed in the first plate, the second plate, and the divider plate.

17. The system of claim 16, wherein the fuel nozzle is configured to receive air from an air flow path through the air flow chamber.

18. The system of claim 16, comprising:
    an outer wall disposed about the head end chamber, wherein the inner wall is disposed within the outer wall, and the cooling air inlet extends through the inner and outer walls to a chamber between the first plate and the divider plate.

* * * * *